(12) United States Patent
Takenaka et al.

(10) Patent No.: US 8,378,969 B2
(45) Date of Patent: Feb. 19, 2013

(54) REMOTE CONTROL APPARATUS FOR VEHICLE

(75) Inventors: Kenichi Takenaka, Handa (JP); Shouji Yamauchi, Ichinomiya (JP)

(73) Assignee: Denso Corporation, Kariya (JP)

(*) Notice: Subject to any disclaimer, the term of this patent is extended or adjusted under 35 U.S.C. 154(b) by 233 days.

(21) Appl. No.: 12/590,172

(22) Filed: Nov. 3, 2009

(65) Prior Publication Data

US 2010/0117957 A1 May 13, 2010

(30) Foreign Application Priority Data

Nov. 7, 2008 (JP) ................................ 2008-286375

(51) Int. Cl.
*G09G 5/08* (2006.01)
*G06F 3/033* (2006.01)

(52) U.S. Cl. ........... 345/157; 345/161; 345/156; 362/23

(58) Field of Classification Search .......... 345/156–157, 345/161, 184; 362/23–30
See application file for complete search history.

(56) References Cited

U.S. PATENT DOCUMENTS

| | | | | |
|---|---|---|---|---|
| 6,839,050 B2* | 1/2005 | Sakamaki et al. | ............ | 345/156 |
| 2003/0234764 A1* | 12/2003 | Noguchi et al. | ............. | 345/156 |
| 2005/0068296 A1 | 3/2005 | Yoshida | | |
| 2005/0168435 A1* | 8/2005 | Reed et al. | ..................... | 345/156 |
| 2005/0212781 A1* | 9/2005 | Clapper | ........................ | 345/184 |
| 2009/0153480 A1* | 6/2009 | Ha et al. | ........................ | 345/160 |

FOREIGN PATENT DOCUMENTS

| | | |
|---|---|---|
| JP | 09-081294 | 3/1997 |
| JP | 11-067017 | 3/1999 |
| JP | 2000-100271 | 4/2000 |
| JP | 2002-007063 | 1/2002 |
| JP | 2002-019494 | 1/2002 |
| JP | 2003-252027 | 9/2003 |
| JP | 2005-100151 | 4/2005 |
| JP | 2006-309511 | 11/2006 |
| JP | 2007-118949 | 5/2007 |

* cited by examiner

*Primary Examiner* — Seokyun Moon
(74) *Attorney, Agent, or Firm* — Harness, Dcikey & Pierce, PLC

(57) ABSTRACT

A remote control apparatus mountable on a vehicle includes an operation input device operable to point a position in a predetermined operation area, a lighting device for illuminating the operation input device, and a controller for controlling a brightness of the lighting device. The remote control apparatus has a self-diagnostic mode for diagnosing a fault in the operation input device. The controller controls the brightness of the lighting device such that the lighting device produces a illumination pattern corresponding to the position pointed by the operation input device, when the self-diagnostic mode is set.

10 Claims, 9 Drawing Sheets

REMOTE CONTROL APPARATUS FOR VEHICLE

CROSS REFERENCE TO RELATED APPLICATION

This application is based on and incorporates herein by reference Japanese Patent Application No. 2008-286375 filed on Nov. 7, 2008.

FIELD OF THE INVENTION

The present invention generally relates to a remote control apparatus mountable on a vehicle and, in particular, relates to a remote control apparatus including an operation input device and having a self-diagnostic function to diagnose a fault in the operation input device.

BACKGROUND OF THE INVENTION

In recent years, there has been an increased number of vehicles in which an operation input is performed by touching a menu item (e.g., command button) displayed on a screen of a display (e.g., a monitor of a navigation apparatus). Such an operation input method is employed in a system disclosed in JP-2006-309511A. In another system disclosed in US 2005/0068296 corresponding to JP-2005-100151A, a display is located at the front of a vehicle interior to reduce a movement of a driver's line of sight. However, since the display is located at a distance from a driver, it is hard for the driver to touch a menu item displayed on a screen of the display. Therefore, the system includes a remote control apparatus having an operation input device installed in a center console of a vehicle. The remote control apparatus causes a pointer to move on the screen according to operation of the operation input device so that the menu item can be selected by the pointer.

There is a possibility that the pointer may become out of control due to a fault in the operation input device. Therefore, it is preferable that the remote control apparatus have a fault diagnostic function to diagnose a fault in the operation input device. JP-2003-252027A discloses an electronic apparatus having a diagnostic function. The electronic apparatus includes a built-in display, and a fault condition can be displayed on the built-in display.

It is assumed that a diagnostic function as disclosed in JP-2003-252027A is added to a remote control apparatus as disclosed in US 2005/0068296. In such a case, a communication circuit is required to display a fault condition on a screen of a display, because the display is separated from an operation input device. Therefore, if communication is not established due to a fault in the communication circuit, the fault condition cannot be displayed on the screen. Further, if a communication error occurs due to the fault in the communication circuit, the fault condition displayed on the screen may incorrectly indicate that a fault occurs in the operation input device, not in the communication circuit.

SUMMARY OF THE INVENTION

In view of the above, it is an object of the present invention to provide a remote control apparatus that is mountable on a vehicle and has a self-diagnostic mode for performing a fault diagnosis without using a display and a communication circuit.

According to an aspect of the present invention, a remote control apparatus mountable on a vehicle includes an operation input device operable to point a position in a predetermined operation area, a lighting device for illuminating the operation input device, and a controller for controlling the lighting device. The remote control apparatus has a self-diagnostic mode for diagnosing a fault in the operation input device. The controller controls the lighting device such that the lighting device produces a illumination pattern corresponding to the position pointed by the operation input device, when the self-diagnostic mode is set.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENT

Figure 1:
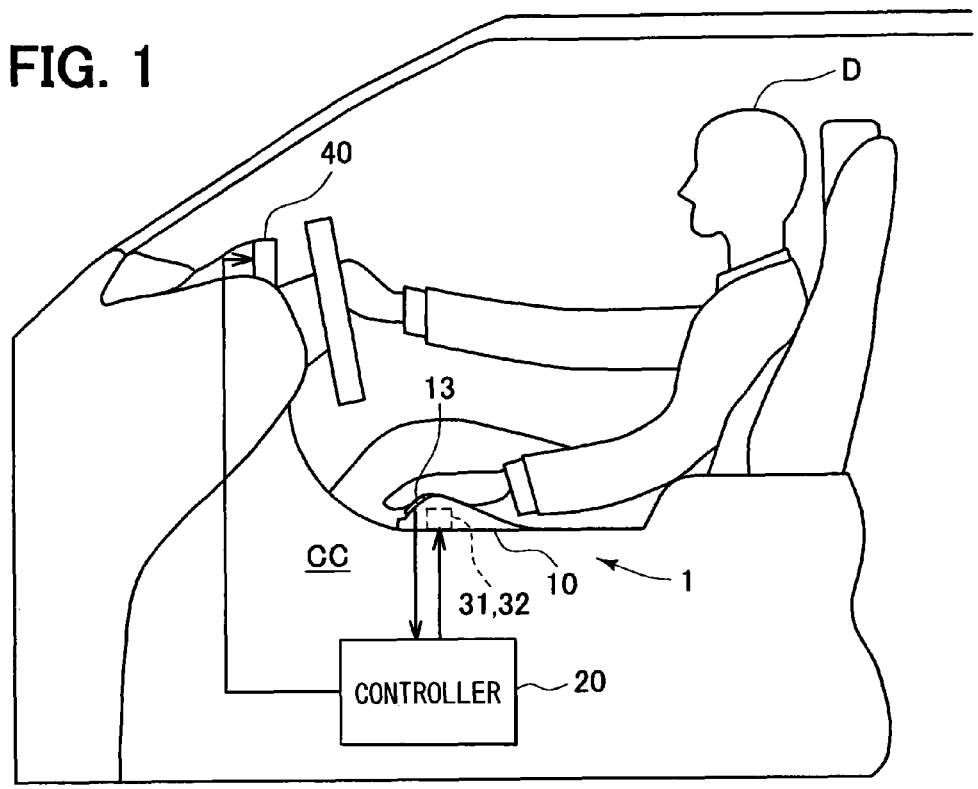
FIG. 1 is a diagram illustrating a vehicle equipped with a remote control apparatus according to an embodiment of the present invention.

A remote control apparatus 1 according to an embodiment of the present invention is described below with reference to FIGS. 1 and 2. The remote control apparatus 1 is configured to control at least one of in-vehicle electronic apparatus including an navigation apparatus, an air-conditioner apparatus, and an audio apparatus. The remote control apparatus 1 includes an operation input device 10 and a controller 20. An operation input to each apparatus is performed through the operation input device 10 and the controller 20.

The operation input device 10 is configured as a pointing device and used to point to a position in a two-dimensional area having a predetermined size. As shown in FIG. 1, the operation input device 10 is integrated with a center console CC in such a manner that a palm of a left hand of a driver D in a left-hand drive vehicle can be naturally rested on the operation input device 10. Thus, the driver D can easily operate the operation input device 10. Alternatively, in the case of a right-hand drive vehicle, the operation input device 10 can be integrated with the center console CC in such a manner that a palm of a right hand of the driver D can be naturally rested on the operation input device 10.

Figure 2:
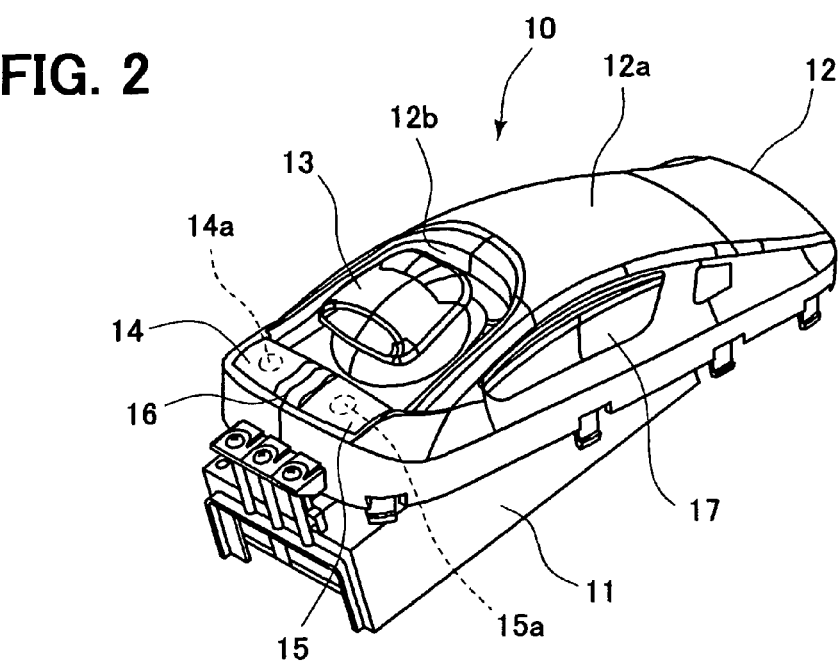
FIG. 2 is a diagram illustrating a perspective view of an operation input device of the remote control apparatus.

As shown in FIG. 2, the operation input device 10 includes a body 11, a cover 12, and an operation knob 13. The cover 12 covers the top side of the body 11. The operation knob 13 is exposed through an opening 12b of the cover 12 so that the driver D can operate the operation knob 13 by directly touching the operation knob 13.

Figure 3:
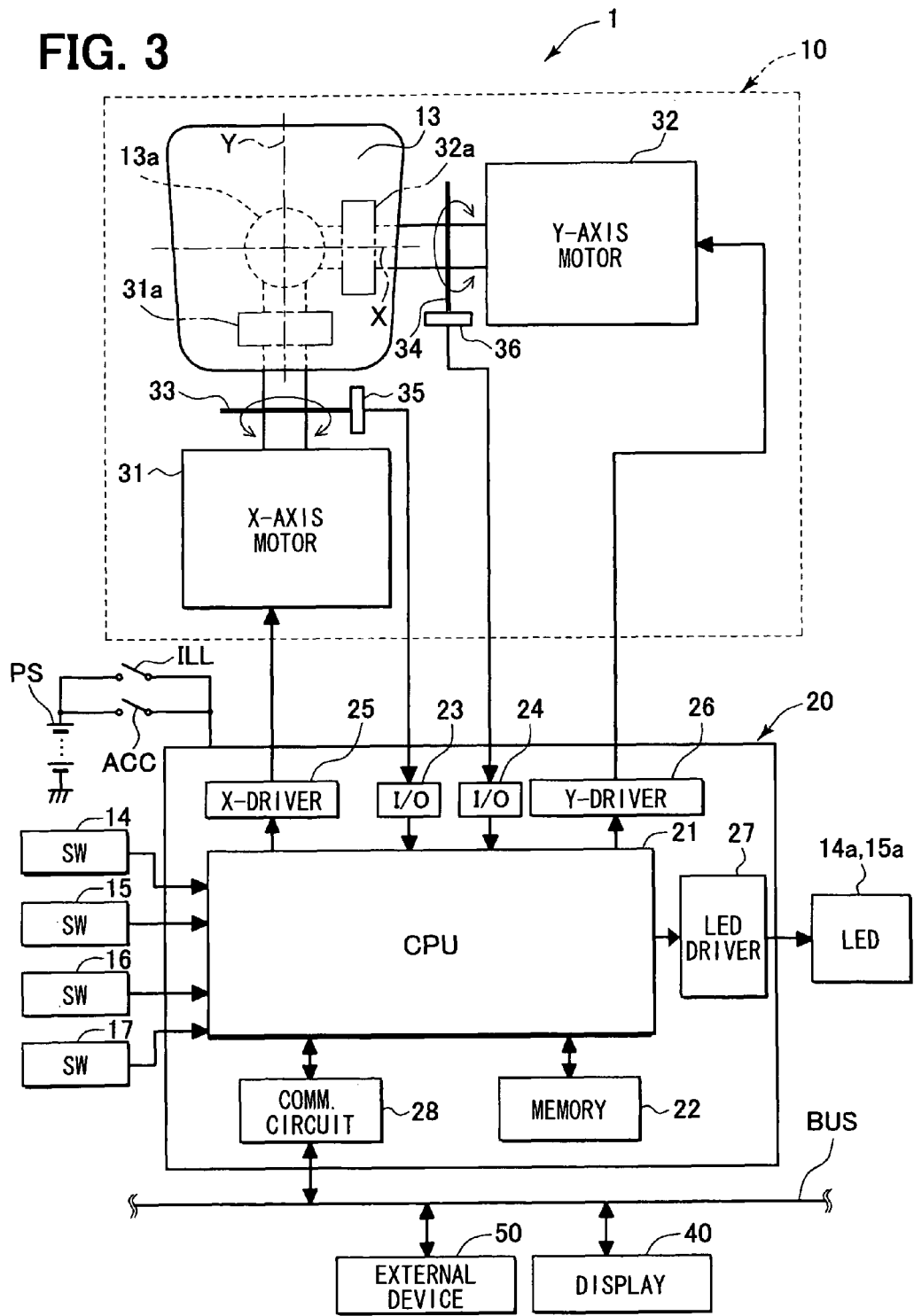
FIG. 3 is a block diagram illustrating the remote control apparatus.

As shown in FIG. 3, electric motors 31, 32 are placed in the body 11. The electric motors 31, 32 serve as actuators for producing reaction force against operation of the operation knob 13. The electric motor 31 is provided corresponding to a X-axis, and the electric motor 32 is provided corresponding to a Y-axis that is orthogonal to the X-axis. The electric motor 31 is coupled to a supporting shaft 13a of the operation knob 13 via a gear mechanism 31a. The gear mechanism 31a converts rotary movement of the electric motor 31 into linear movement along the X-axis and applies the X-axis linear movement to the supporting shaft 13a of the operation knob 13. Likewise, the electric motor 32 is coupled to the supporting shaft 13a of the operation knob 13 via a gear mechanism 32a. The gear mechanism 32a converts rotary movement of the electric motor 32 into linear movement along the Y-axis and applies the Y-axis linear movement to the supporting shaft 13a of the operation knob 13. The electric motors 31, 32 are driven based on control signals from the controller 20 so that reaction force in a direction opposite to an operation direction of the operation knob 13 can be applied to the operation knob 13.

The operation knob 13 has two-dimensional freedom of movement. A position of the operation knob 13 is detected by a position detecting mechanism constructed with code plates 33, 34 and photo-interrupters 35, 36. Each of the code plates 33, 34 is a circular plate having slits that are arranged in a radial manner. The code plates 33, 34 are fixed to rotating shafts of the electric motors 31, 32, respectively. The photo-interrupter 35 is configured as a photo integrated circuit (IC) including signal diodes facing each other across the code plate 33, a photo diode, a preamplifier, a comparator, and an output buffer. Likewise, the photo-interrupter 36 is configured as a photo IC including signal diodes facing each other across the code plate 34, a photo diode, a preamplifier, a comparator, and an output buffer. Position information detected by the photo-interrupters 35, 36 are fed back to the controller 20. That is, the amount of rotation and the direction of rotation of the code plates 33, 34 changing according to the position of the operation knob 13 are fed back to the controller 20.

Figure 4:
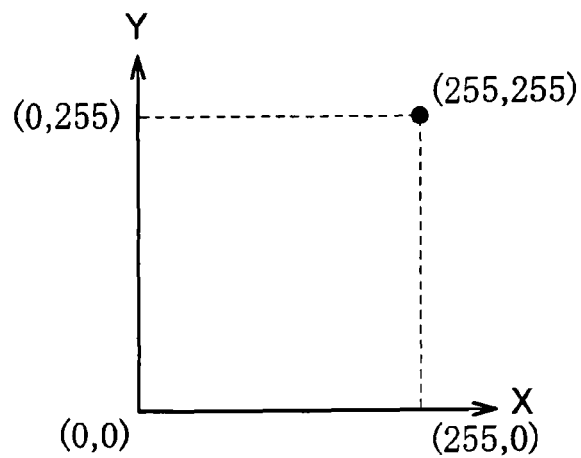
FIG. 4 is a diagram illustrating XY coordinates corresponding to an operation area of an operation knob of the operation input device.

Specifically, as shown in FIG. 4, the position of the operation knob 13 is addressed by using a XY coordinate value from (0, 0) to (255, 255). For example, when the operation knob 13 is moved to a bottom left limit of the operation area, the XY coordinate value of the operation knob 13 becomes (0, 0). For another example, when the operation knob 13 is moved to a top right limit of the operation area, the XY coordinate value of the operation knob 13 becomes (255, 255). The position information indicating the XY coordinate value of the operation knob 13 is sent to the controller 20.

Returning to FIG. 2, the operation input device 10 further includes push switches 14, 15, and a seesaw switch 16. The push switches 14, 15 and the seesaw switch 16 are integrated with the cover 12 and located closer to the front of the vehicle than the operation knob 13. The push switches 14, 15, and, the seesaw switch 16 are used to change menu items (e.g., command buttons) displayed on a screen of a display 40, which is shown in, for example, FIG. 1 and FIG. 3. The menu items are used to control an external device 50, which is shown in FIG. 3. The operation input device 10 further includes push switches 17 located on each side of the cover 12. The push switches 17 are used to confirm the menu items. The push switches 14, 15 have lighting devices 14a, 15a, respectively. In the present embodiment, each of the lighting devices 14a, 15a includes a light emitting diode (LED). For example, the LEDs 14a, 15a can illuminate during night hours so that the driver D can see names of the push switches 14, 15.

Returning to FIG. 3, the controller 20 includes a central Processing unit (CPU) 21, a memory 22, and a storage device (not shown) including a read only memory (ROM) and a random access memory (RAM). For example, the memory 22 can be a nonvolatile memory such as an erasable programmable read only memory (EEPROM). When an ignition switch (not shown) or an accessory (ACC) switch is turned ON, an electric current is supplied to the controller 20.

The CPU 21 is connected to each of input/output (I/O) devices 23, 24, a X-driver 25, a Y-driver 26, and a LED driver 27. The I/O devices 23, 24 receive signal input from the operation input device 10. The X-driver 25 and the Y-driver 26 output motor drive signals to the electric motors 31, 32, respectively. The LED driver 27 outputs a LED drive signal to each of the LEDs 14a, 15a. The CPU 21 can perform a PWM control of the LED driver 27 to change a duty ratio of the LED drive signal, thereby adjusting brightness (luminance) of the LEDs 14a, 15a. The CPU 21 loads programs stored in the ROM into the RAM and executes the loaded programs. Flowcharts illustrating the programs are shown in FIGS. 6-13.

The controller 20 is connected to a communication bus BUS through a communication circuit 28. The communication bus BUS is part of an in-vehicle local area network (LAN). The controller 20 and the display 40 can communicates with each other through the communication bus BUS. Likewise, the controller 20 and the external device 50 can communicates with each other through the communication bus BUS. The controller 20 sends to the display 40 the position information of the operation knob 13 and switch information of the switches 14-17. As mentioned above, the position information indicates the position of the operation knob 13. The switch information indicates switch positions of the switches 14-17, i.e., indicates whether the switches 14-17 are ON or OFF.

In response to the position information and the switch information, the display 40 moves a pointer on the screen according to the position of the operation knob 13 and changes the screen according to the switch positions of the switches 14-17. At this time, the controller 20 receives reaction force information from the display 40. The reaction force information depends on the menu items displayed on the screen of the display 40 and indicates reaction force to be applied to the operation knob 13.

Figure 5A:
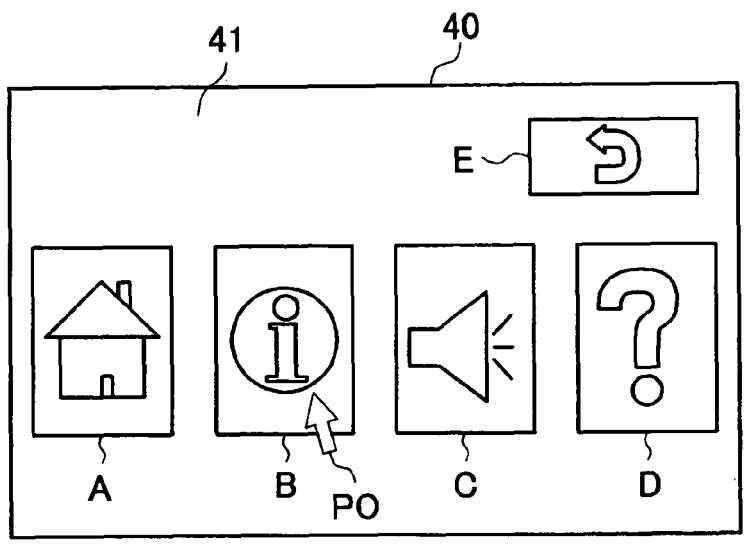
FIG. 5A is a diagram illustrating menu items displayed on a screen of a display.
Figure 5B:
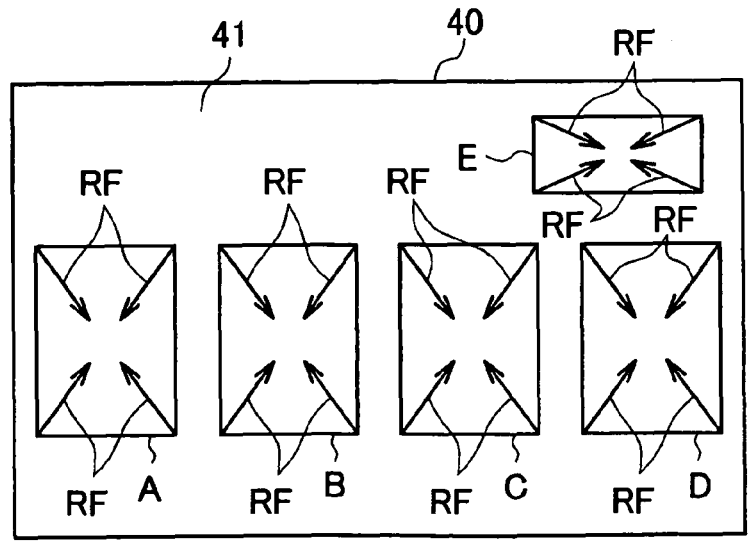
FIG. 5B is a diagram illustrating operation reaction forces acting corresponding to the menu items of FIG. 5A.

As an example, FIG. 5A illustrates a case where menu items A-E are displayed on a screen 41 of the display 40 according to the switch positions of the switches 14-17, and a pointer PO is portioned over the menu item B according to the position of the operation knob 13. In this condition, if the operation knob 13 is operated in a left direction, the pointer PO moves on the screen 41 toward the menu item A with respect to the menu item B. In contrast, if the operation knob 13 is operated in a right direction, the pointer PO moves on the screen 41 toward the menu item C with respect to the menu item B.

When the pointer PO is at least partially positioned over one of the menu items A-E, a reaction force RF is applied to the operation knob 13 so that the pointer PO can be attracted to the center of the one of the menu items A-E. The reaction force RF can vary depending on the menu items A-E. For example, the reaction force information indicating the reaction force RF is stored in the ROM. The reaction force RF applied to the operation knob 13 is maximum when the pointer PO is positioned at an edge of each of the menu items A-E and gradually decreases as the pointer PO approaches the center of each of the menu items A-E.

In such an approach, the operation knob 13 can be easily operated in a direction corresponding to a direction in which the pointer PO approaches the center of each of the menu items A-E. In summary, the reaction force information depending on the menu items A-E displayed on the screen 41 of the display 40 is sent to the controller 20 from the display 40, and the display 40 controls torques of the electric motors 31, 32 according to the reaction force information so that the driver D can feel the reaction force RF applied to the operation knob 13.

Next, a main process performed by the CPU 21 of the controller 20 is described below with reference to FIG. 6. The main process is repeatedly performed by the CPU 21 each time the CPU 21 starts up.

Figure 6:
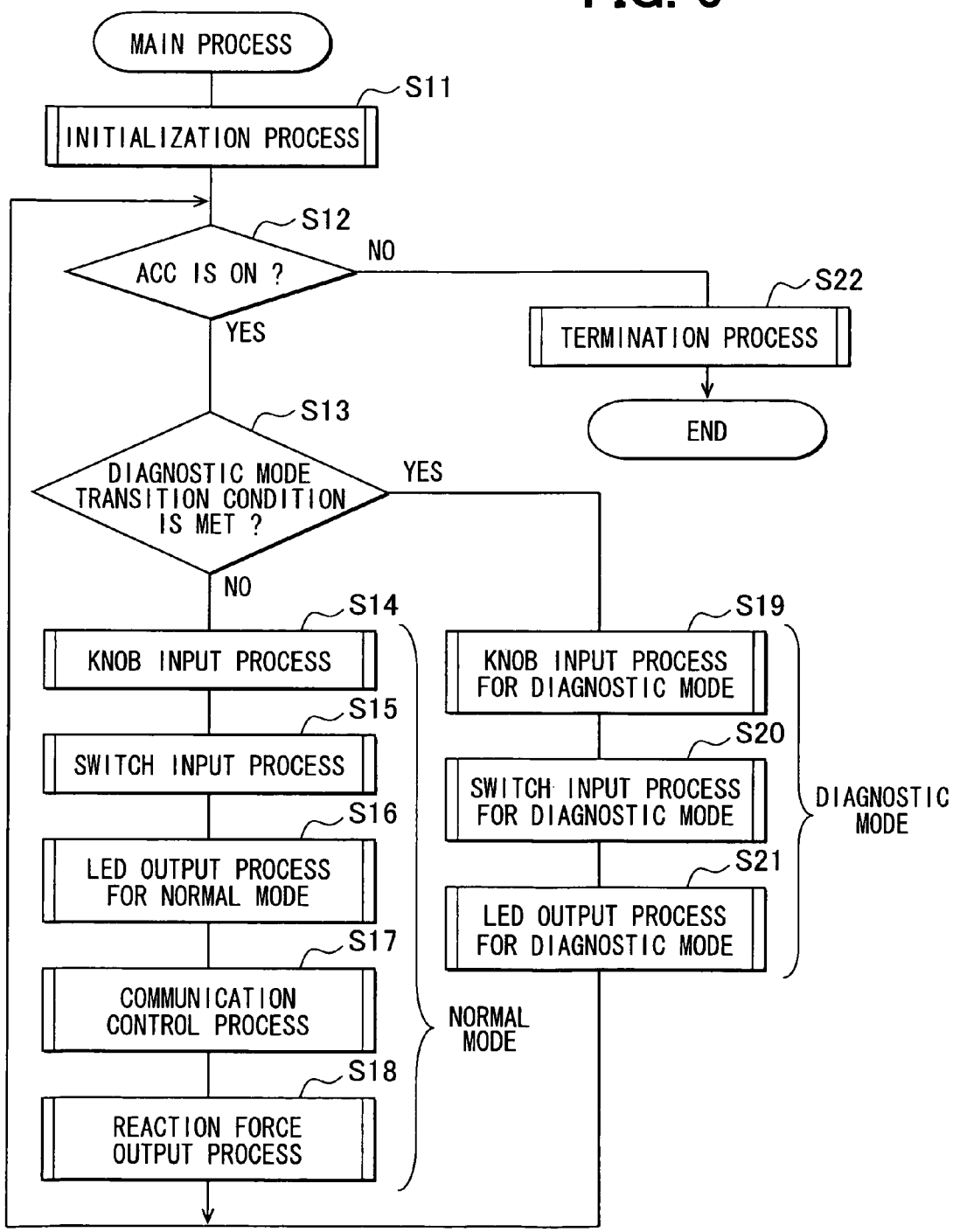
FIG. 6 is a diagram illustrating a flow chart of a main process performed by a controller of the remote control apparatus.
Figure 7:
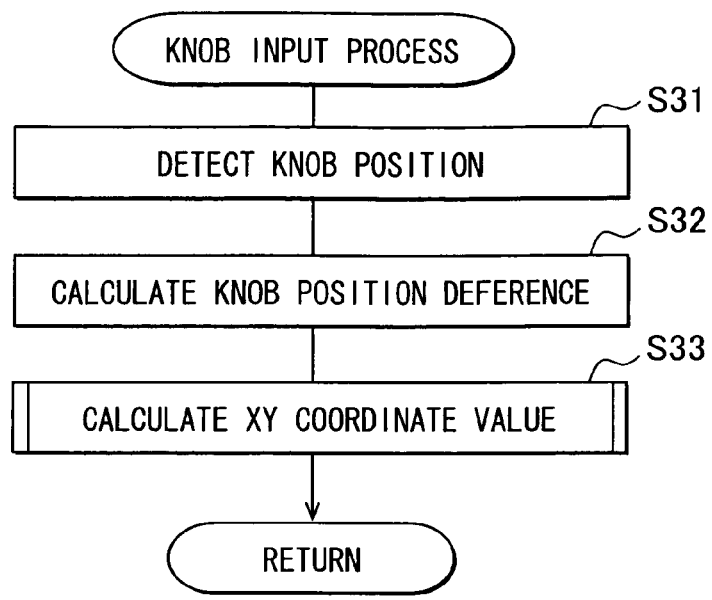
FIG. 7 is a diagram illustrating a flow chart of an operation knob input process performed by a controller of the remote control apparatus.

As shown in the flow chart in FIG. 6, the main process starts at S11, where the CPU 21 performs an initialization process. Then, the main process proceeds to S12, where the CPU 21 determines whether the ACC switch is. ON or OFF. If the ACC switch is OFF corresponding to NO at S12, the main process proceeds to S22, where the CPU 21 performs a termination process, and then the CPU 21 exits the main process. In contrast, if the ACC switch is ON corresponding to YES at S12, the main process proceeds to S13. At S13, the CPU 21 determines whether a self-diagnostic mode transition condition is met.

For example, the self-diagnostic mode transition condition can be met, if a specific one of the switches 14-16 is depressed or specific two of the switches 14-16 are depressed at the same time during a period when the ACC switch is ON. The specific two of the switches 14-16 depressed at the same time are selected in such a manner that a combination of the specific two of the switches 14-16 does not activate another function.

For another example, the self-diagnostic mode transition condition can be met, if specific two of the switches 14-16 are depressed in a predetermined order during a period when the ACC switch is ON. The specific two of the switches 14-16 depressed in the predetermined order are selected in such a manner that a combination of the specific two of the switches 14-16 does not activate another function.

If the self-diagnostic mode transition condition is not met corresponding to NO at S13, the CPU 21 enters a normal mode and performs a normal mode procedure defined by S14-S18. Specifically, the main process proceeds from S13 to S14, where the CPU 21 performs an operation knob input process shown in FIG. 7. The operation knob input process starts at S31, where the CPU 21 detects a current position of the operation knob 13 in the operation area and stores the current position in the memory 22. Then, the operation knob input process proceeds to S32, where the CPU 21 calculates a difference between the current position and a previous position that is previously stored in the memory 22. Then, the operation knob input process proceeds to S33, where the CPU 21 calculates a XY coordinate value indicating the current position based on the difference between the current position and the previous position. Thus, the current position of the operation knob 13 in the operation area is converted into the XY coordinate value from (0, 0) to (255, 255). Then, the CPU 21 exits the operation knob input process and returns to the main process.

Figure 8:
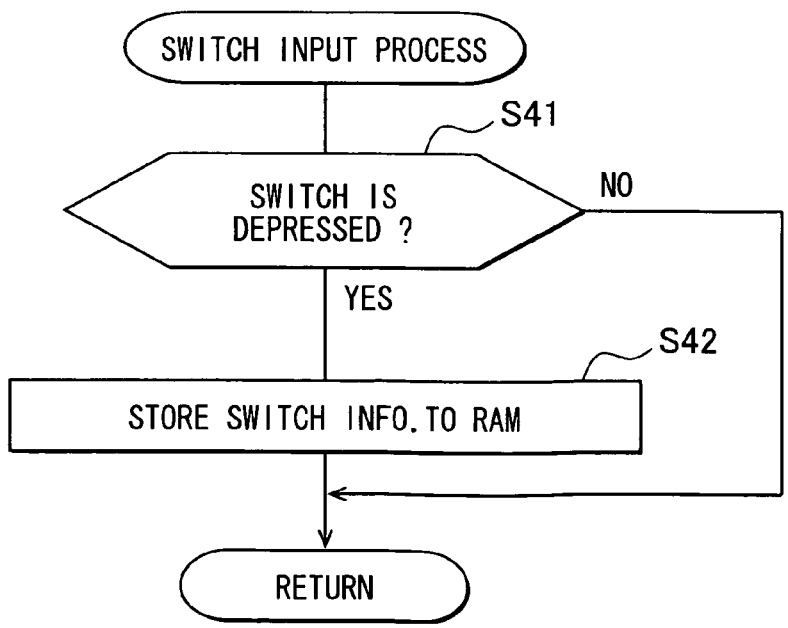
FIG. 8 is a diagram illustrating a flow chart of a switch input process performed by the controller.

Returning to FIG. 6, the main process proceeds from S14 to S15, where the CPU 21 performs a switch input process shown in FIG. 8. The switch input process starts at S41, where the CPU 21 determines whether any one of the switches 14-17 is depressed. If none of the switches 14-17 is depressed corresponding to NO at S41, the CPU 21 exits the switch input process. In contrast, if any one of the switches 14-17 is depressed corresponding to YES at S41, the switch input process proceeds to S42, where the CPU 21 stores the switch information to the RAM. As mentioned previously, the switch information indicates whether the switches 14-17 are depressed, i.e., ON. Then, the CPU 21 exits the switch input process and returns to the main process.

Figure 9:
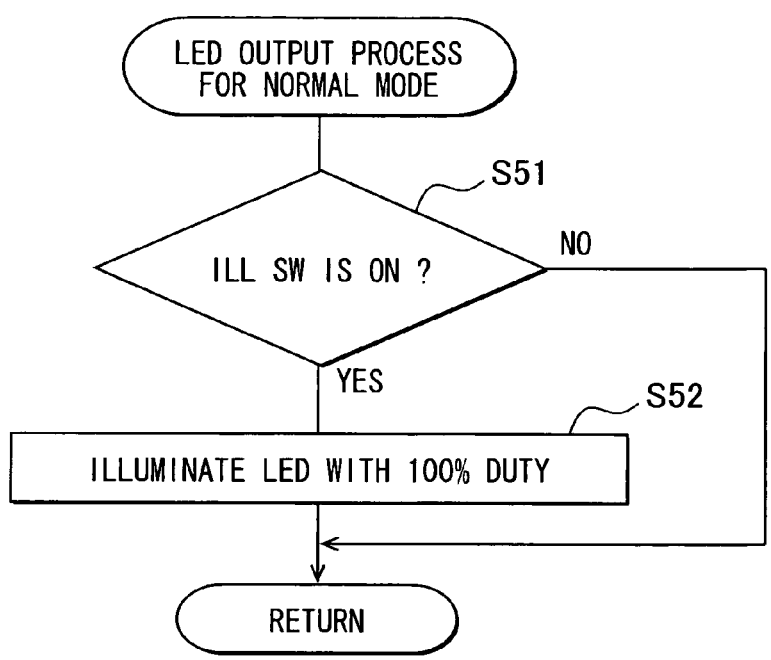
FIG. 9 is a diagram illustrating a flow chart of a LED output process for normal mode performed by the controller.

Returning to FIG. 6, the main process proceeds from S15 to S16, where the CPU 21 performs a LED output process for normal mode shown in FIG. 9. The LED output process for normal mode starts at S51, where the CPU 21 determines where an illumination (ILL) switch shown in FIG. 3 is ON. If the ILL switch is OFF corresponding to NO at S51, the CPU 21 exits the LED output process for normal mode and returns to the main process. In contrast, if the ILL switch is ON corresponding to YES at S51, the LED output process for normal proceeds to S52, where the CPU 21 illuminates each of the LEDs 14a, 15a of the switches 14, 15. Specifically, at S52, the CPU 21 controls the LED driver 27 so that the duty ratio of each of the LEDs 14a, 15a can be set to 100%. Thus, each of the LEDs 14a, 15a illuminates at its maximum brightness. Then, the CPU 21 exits the LED output process for normal mode and returns to the main process.

Figure 10:
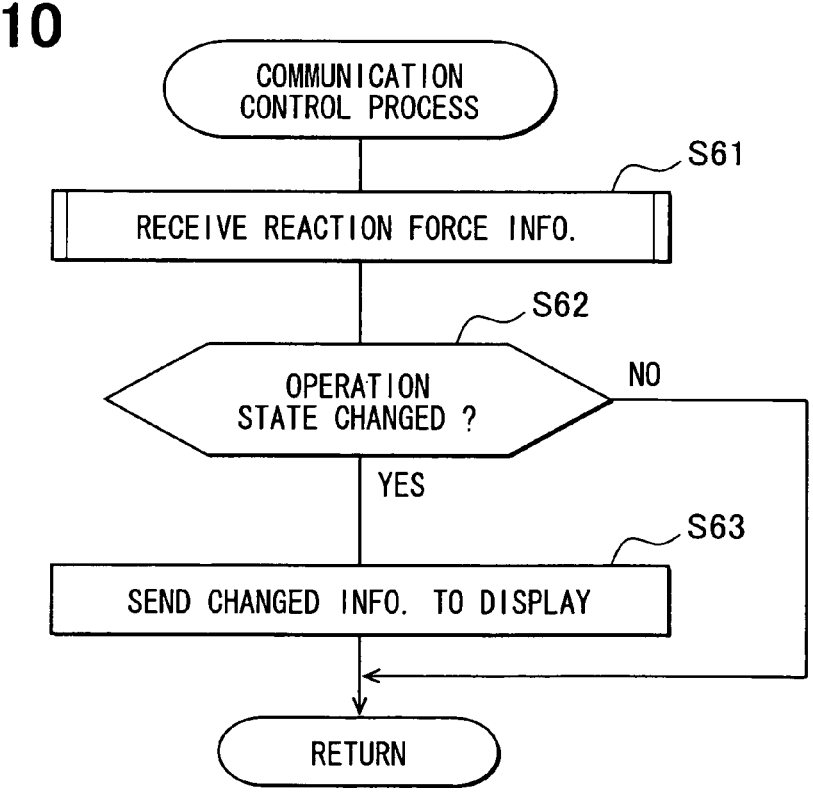
FIG. 10 is a diagram illustrating a flow chart of a communication control process performed by the controller.
Figure 11:
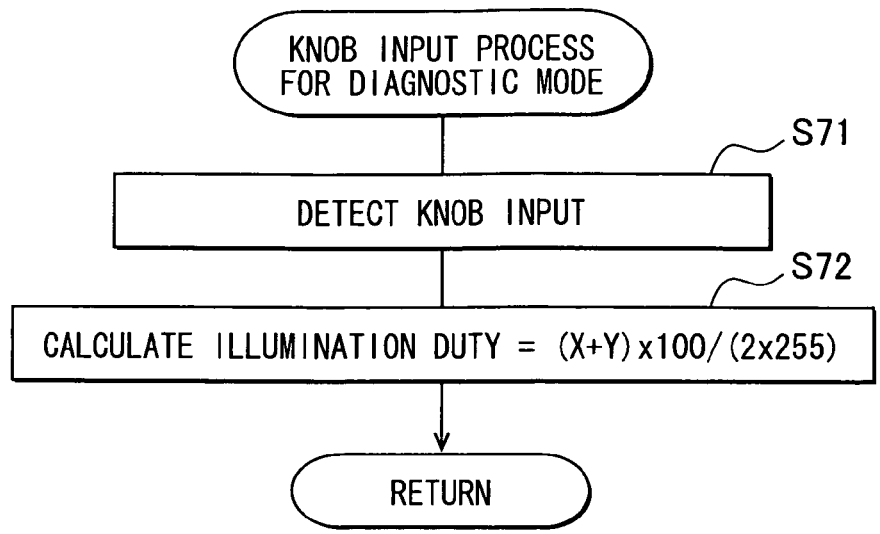
FIG. 11 is a diagram illustrating a flow chart of an operation knob input process for diagnostic mode performed by the controller.

Returning to FIG. 6, the main process proceeds from S16 to S17, where the CPU 21 performs a communication control process shown in FIG. 10. The communication process starts at S61, where the CPU 21 receives the reaction force information from the display 40. Then, the communication process proceeds to S62, where the CPU 21 determines whether a change in an operation state is detected in the operation knob input process performed at S14 or in the switch input process performed at S15. That is, at S62, the CPU determines whether there is a change in the position information or the switch information. If there is no change in the operation state corresponding to NO at S62, the CPU 21 exits the communication control process and returns to the main process. In contrast, if there is a change in the operation state corresponding to YES at S62, the communication control process proceeds to S63. At S63, the CPU 21 sends the changed information to the display 40. Then, the CPU 21 exits the communication control process and returns to the main process.

Returning to FIG. 6, the main process proceeds from S17 to S18, where the CPU 21 performs a reaction force output process. Specifically, at S18, the CPU 21 determines values of electric currents supplied to the X-driver 25 and the Y-driver 26 based on the reaction force information received at S17 and the position difference detected at S14. Thus, a feeing of operation (i.e., reaction force) can be obtained according to the menu items A-E displayed on the screen 41 of the display 40, when the operation knob 13 is operated.

The above normal mode procedure defined by S14-S18 is performed each time the operation knob 13 is operated. In this way, the pointer PO moves on the screen 41 of the display 40 according to operation of the operation knob 13, while the operation knob 13 receives the reaction force against the operation.

In contrast, if the self-diagnostic mode transition condition is met corresponding to YES at S13, the CPU 21 enters a self-diagnostic mode and performs a self-diagnostic mode procedure defined by S19-S21. Specifically, the main process proceeds from S13 to S19, where the CPU 21 performs an operation knob input for diagnostic mode shown in FIG. 11. The operation knob input process for diagnostic mode starts at S71, where the CPU 21 detects an input from the operation knob 13, thereby calculating the XY coordinate value of the current position of the operation knob 13. That is, S71 in the operation knob input process for diagnostic mode shown in FIG. 11 corresponds to S31-S33 in the operation knob input process shown in FIG. 7. Then, the operation knob input process for diagnostic mode proceeds to S72, where the CPU 21 calculates a duty ratio of each of the LEDs 14a, 15a by substituting the XY coordinate value into the following equation:

$$\text{DUTY}(\%) = (X+Y) \times 100/(2 \times 255) \quad (1)$$

Thus, the duty ratio of each of the LEDs 14a, 15a can correspond uniquely to the current position of the operation knob 13. Then, the CPU 21 exits the operation knob input process for diagnostic mode and returns to the main process.

Figure 12:
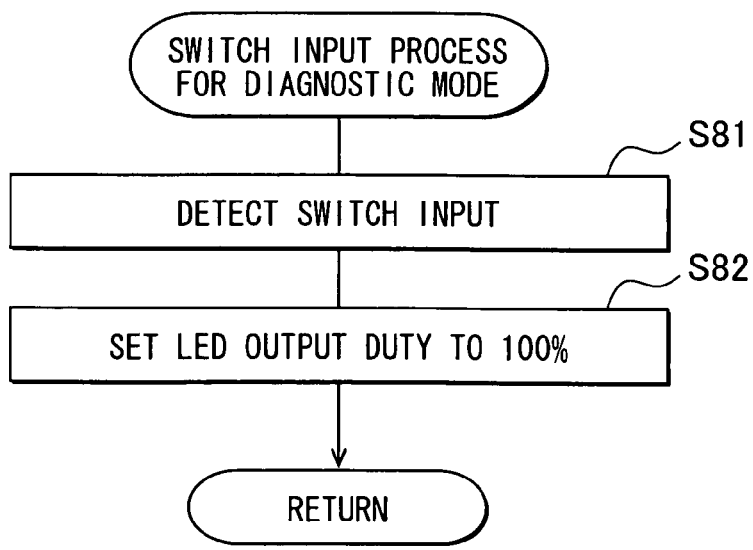
FIG. 12 is a diagram illustrating a flow chart of a switch input process for diagnostic mode performed by the controller.

Returning to FIG. 6, the main process proceeds from S19 to S20, where the CPU 21 performs a switch input process for diagnostic mode shown in FIG. 12. The switch input process for diagnostic mode starts at S81, where the CPU 21 detects an input from the switches 14, 15. That is, at S81, the CPU 21 detects whether at least one of the switches 14, 15 is depressed.

Then, the switch input process for diagnostic mode proceeds to S82, where the CPU 21 sets the duty ratio of the LED of the depressed switch to 100%. For example, if a depression of only the switch 14 is detected at S81, the CPU 21 sets the duty ratio of the LED 14a to 100% at S82. For another example, if a depression of each of the switches 14, 15 is detected at S81, the CPU 21 sets the duty ratio of each of the LEDs 14a, 15a to 100% at S82. Then, the CPU 21 exits the switch input process for diagnostic mode and returns to the main process.

Figure 13:
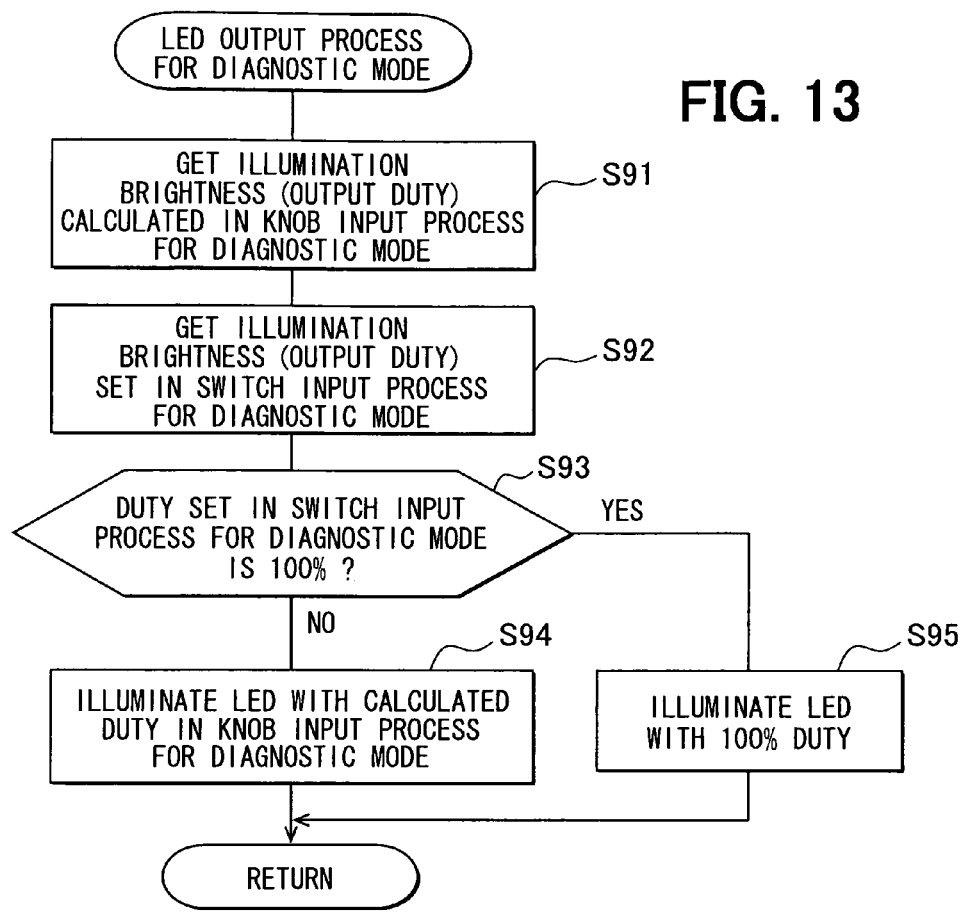
FIG. 13 is a diagram illustrating a flow chart of a LED output process for diagnostic mode performed by the controller.
Figure 14:
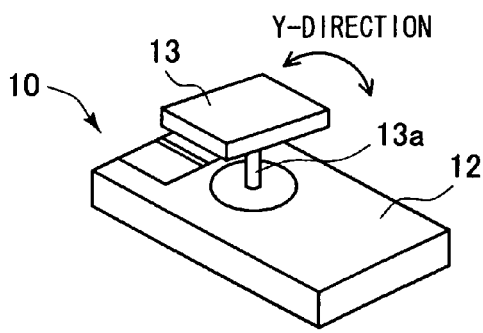
FIG. 14 is a diagram illustrating an operation knob according to a first modification of the embodiment.
Figure 15:
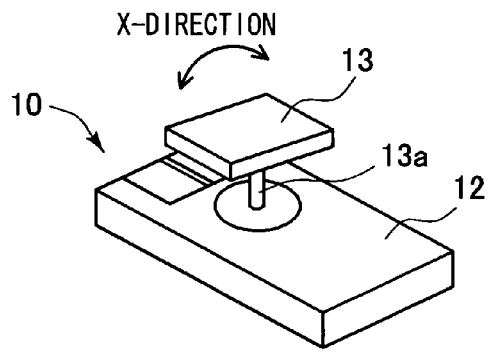
FIG. 15 is a diagram illustrating an operation knob according to a second modification of the embodiment.
Figure 16:
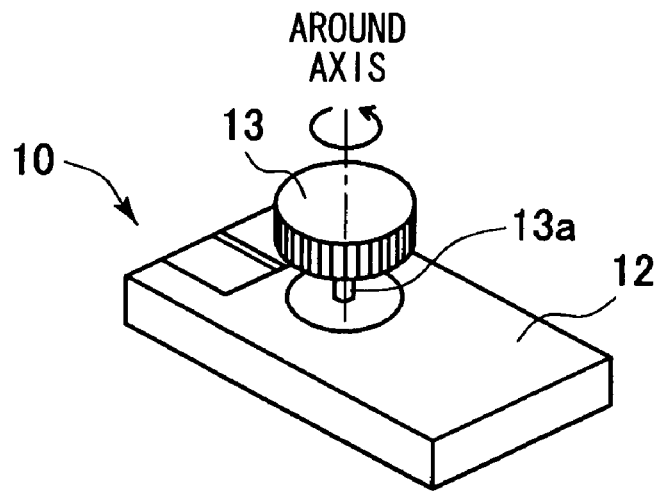
FIG. 16 is a diagram illustrating an operation knob according to a third modification of the embodiment.
Figure 17:
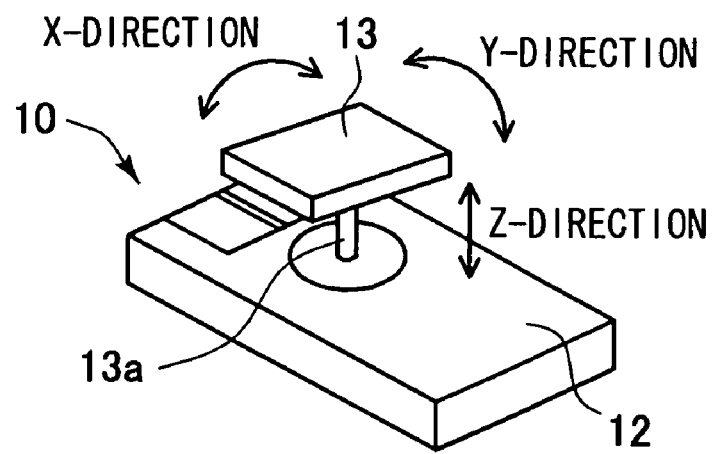
FIG. 17 is a diagram illustrating an operation knob according to a fourth modification of the embodiment.

Returning to FIG. 6, the main process proceeds from S20 to S21, where the CPU 21 performs a LED output process for diagnostic mode shown in FIG. 13. The LED output process for diagnostic mode starts at S91, where the CPU 21 gets the duty ratio calculated in the operation knob input process for diagnostic mode. Then, the LED output process for diagnostic mode proceeds to S92, where the CPU 21 gets the duty ratio set in the switch input process for diagnostic mode.

Then, the LED output process for diagnostic mode proceeds to S93, where the CPU 21 determines whether the duty ratio gotten at S92 is 100%. If the duty ratio gotten at S92 is not 100% corresponding to NO at S93, the LED output process for diagnostic mode proceeds to S94. At S94, the CPU 21 illuminates the LEDs 14a, 15a with the duty ratio gotten at S91 so that the LEDs 14a, 15a can produce a illumination pattern corresponding uniquely to the position of the operation knob 13.

For example, when the XY coordinate value of the operation knob 13 is (0, 0), the duty ratio gotten at S91 is 0% so that each of the LEDs 14a, 15a can be OFF. For another example, when the XY coordinate value of the operation knob 13 is (255, 255), the duty ratio gotten at S91 is 100% so that each of the LEDs 14a, 15a can illuminate at its maximum brightness.

In this way, the brightness of the LEDs 14a, 15a changes according to the position of the operation knob 13, as long as the operation knob 13 (specifically, the position detection mechanism constructed with the code plates 33, 34 and the photo-interrupters 35, 36) functions normally. Therefore, the operation knob 13 can be diagnosed as normal, when the brightness of the LEDs 14a, 15a changes according to the position of the operation knob 13. In contrast, the operation knob 13 can be diagnosed as abnormal, when the brightness of the LEDs 14a, 15a does not change according to the position of the operation knob 13. For example, the operation knob 13 can be diagnosed as abnormal, when the brightness of the LEDs 14a, 15a remain zero regardless of the position of the operation knob 13. Thus, a fault in the operation knob 13 can be detected without using the display 40.

In contrast, if the duty ratio gotten at S92 is 100% corresponding to YES at S93, the LED output process for diagnostic mode proceeds to S95. At S95, the CPU 21 illuminates the LEDs 14a, 15a with the duty ratio of 100%. As mentioned previously, the duty ratio of the LED of the depressed switch is set to 100%. Consequently, at S95, the LED of the depressed switch illuminates at its maximum brightness.

Therefore, a control system of the depressed switch can be diagnosed as normal, when the LED of the depressed switch illuminates at its maximum brightness. In contrast, the control system of the depressed switch can be diagnosed as abnormal, when the LED of the depressed switch does not illuminate at its maximum brightness.

That is, in the self-diagnostic mode procedure defined by S19-S21, if the switches 14, 15 are depressed during a period when the operation knob 13 being operated, or if the operation knob 13 is operated during a period when the switches 14, 15 remain depressed, the duty ratio set in the switch input process for diagnostic mode at S20 is given priority over the duty ratio calculated in the operation knob input process for diagnostic mode at S19. In such an approach, faults in the control systems of the switches 14, 15 can be detected. It is noted that the brightness of the LEDs 14a, 15a can change according to the position of the operation knob 13, when the depression of the switches 14, 15 is released.

Returning to FIG. 6, if the ACC switch is turned OFF, the CPU 21 can exit the self-diagnostic mode procedure. Then, the CPU 21 exits the main process after performing the termination process at S22.

The CPU 21 can exit the self-diagnostic mode procedure in response to another trigger event in addition to or instead of the turn-off of the ACC switch. For example, the CPU 21 can exit the self-diagnostic mode procedure, when the controller 20 is reset. For another example, the CPU 21 can exit the self-diagnostic mode procedure, when the operation knob 13 and the switches 14, 15 remain unoperated for a predetermined period of time measured by a time counter or the like.

As described above, according to the embodiment, when the self-diagnostic mode is set, the brightness of the LEDs 14a, 15a for illuminating the operation input device 10 is controlled by the controller 20 in such a manner that the LEDs 14a, 15a can produce a illumination pattern corresponding to the position pointed by the operation input device 10.

In such an approach, even when a fault occurs in the communication circuit 28 or communication established through the communication circuit 28, a fault diagnosis of the operation input device 10 can be performed, irrespective of the communication system, based on the change in the brightness of the LEDs 14a, 15a.

(Modification)

The embodiment described above can be modified in various ways. In the embodiment, the position of the operation knob 13 is detected with a resolution of 255 steps in each of the X-axis direction and the Y-axis direction. The resolution can be changed as needed. It is noted that the value "255" in the equation (1) needs to be changed according to the resolution.

For example, the equation (1) can be modified as follows:

$$\text{DUTY}(\%) = -10 \times (X+Y)/51 + 100 \qquad (2)$$

According to the equation (2), the duty ratio of the LEDs 14a, 15a becomes 100% when the XY coordinate value of the operation knob 13 is (0, 0), and the duty ratio of the LEDs 14a, 15a becomes 0% when the XY coordinate value of the operation knob 13 is (255, 255). That is, an illumination pattern produced based on the equation (2) becomes opposite to an illumination pattern produced based on the equation (1).

The duty ratio of the LEDs 14a, 15a corresponding uniquely to the position of the operation knob 13 can be obtained without using such equations (1), (2). For example, a mapping table that defines an unique correspondence relationship between the duty ratio of the LEDs 14a, 15a and the position of the operation knob 13 can be prestored in the ROM, and the duty ratio of the LEDs 14a, 15a can be obtained by referring to the mapping table.

In addition to or instead of the switches 14, 15, the switches 16, 17 can be provided with lighting devices such as LEDs. In such an approach, faults in control systems of the switches 16, 17 can be detected. Further, in addition to or instead of the switches 14-17, the operation knob 13 can be provided with a lighting device for illuminating the operation knob 13. For example, the lighting device for illuminating the operation knob 13 can be placed around or near the opening 12b of the cover 12.

In the embodiment, the operation knob 13 is operated in a two-dimensional area. Alternatively, the operation knob 13 can be operated in a one-dimensional area or a three-dimensional area. For example, the operation knob 13 can be modified as shown in FIGS. 14-17. The operation knob 13 shown in FIGS. 14-16 can be operated in a one dimensional area, and the operation knob 13 shown in FIG. 17 can be operated in a three dimensional area. Specifically, the operation knob 13 shown in FIG. 14 can be operated to move in a Y-direction (e.g., front-rear direction of the vehicle). The operation knob 13 shown in FIG. 15 can be operated to move in a X-direction (e.g., side-to-side direction of the vehicle). The operation knob 13 shown in FIG. 16 can be operated to rotate around axis, i.e., the supporting shaft 13a. The operation knob 13 shown in FIG. 17 can be operated to move in each of the X-direction, the Y-direction, and a Z-direction (e.g., top-bottom direction of the vehicle). For example, the operation knob 13 shown in FIG. 17 can have a position sensor for detecting a height of the supporting shaft 13a to detect a displacement of the supporting shaft 13a in the Z-direction. According to the modifications shown in FIGS. 14-17, the fault diagnosis of the operation input device 10 can be performed by changing the brightness of the lighting devices according to the position of the operation knob 13.

In the embodiment, the fault diagnosis is performed based on a change in brightness of the LEDs 14a, 15a. Alternatively, for example, the fault diagnosis can be performed based on a change in frequency of blinking of the LEDs 14a, 15a. For example, the frequency of blinking of the LEDs 14a, 15a can be calculated as follows:

$$\text{BLINKING FREQUENCY}(\text{Hz}) = (X+Y) \times 20/(2 \times 255) + 1 \qquad (3)$$

According to the equation (3), the blinking frequency of the LEDs 14a, 15a becomes 1 Hz when the XY coordinate value of the operation knob 13 is (255, 255), and the blinking frequency of the LEDs 14a, 15a becomes 21 Hz when the XY coordinate value of the operation knob 13 is (0, 0). Therefore, the operation knob 13 can be diagnosed as normal, when the blinking frequency of the LEDs 14a, 15a changes according to the position of the operation knob 13. In contrast, the operation knob 13 can be diagnosed as abnormal, when the blinking frequency of the LEDs 14a, 15a does not change according to the position of the operation knob 13.

Such changes and modifications are to be understood as being within the scope of the present invention as defined by the appended claims.

What is claimed is:

1. A remote control apparatus mountable on a vehicle comprising:
    an operation input section having a two-dimensional freedom of movement operable to control a position of an indicator in a predetermined operation area on a display separate from the remote control apparatus;
    a lighting section configured to illuminate the operation input section;
    an illumination switch;
    means for determining whether a predetermined self-diagnostic condition is met;
    means for setting a self-diagnostic mode when the self-diagnostic condition is met; and
    a control section configured to control the lighting section, wherein
    the self-diagnostic mode diagnoses a fault in the operation input section,
    when the self-diagnostic mode is set, the control section controls illumination duty of the lighting section based on an illumination pattern corresponding to an X-Y position of the operation input section, and
    when the self-diagnostic mode is not set, the control section controls the illumination duty of the lighting section based on a status of the illumination switch.

2. The remote control apparatus according to claim 1, wherein
    the operation input section includes an operation knob movable in the operation area and a position detection mechanism configured to detect a position of the operation knob, and
    the illumination pattern corresponds uniquely to the position of the operation knob detected by the position detection mechanism.

3. The remote control apparatus according to claim 1, wherein
    the control section changes a brightness of the lighting section or changes a frequency of blinking of the lighting section as the illumination pattern.

4. The remote control apparatus according to claim 2, wherein
    the lighting section includes a light emitting diode,
    when the self-diagnostic mode is set, the control section calculates an output duty ratio of the light emitting diode as the illumination pattern corresponding uniquely to the position of the operation knob detected by the position detection mechanism, and the control section causes the light emitting diode to be illuminated with the calculated output duty ratio.

5. The remote control apparatus according to claim 4, wherein the operation input section includes a push switch configured to be turned ON to perform a predetermined function when being depressed, and when the self-diagnostic mode is set, the control section causes the light emitting diode to be illuminated with a predetermined output duty ratio, in reference to the calculated output duty ratio, upon detection that the push switch is depressed.

6. The remote control apparatus according to claim 1, wherein the operation input section is a light emitting diode, and the control section is a light emitting diode driver.

7. A remote control apparatus mountable on a vehicle, the apparatus comprising:

an operation input section controlling a position of an indicator in a predetermined operation area on a display separate from the remote control apparatus;

a lighting section illuminating the operation input section, the lighting section including at least one light source;

a control section controlling the lighting section; wherein the remote control apparatus has a self-diagnostic mode diagnosing a fault in the operation input section;

the control section changes a duty ratio of a drive signal provided to the at least one light source anywhere between 0% and 100% based on an X-Y position of the indicator in the predetermined operation area of the display when the self-diagnostic mode is set; and the duty ratio of the drive signal provided to the at least one light source when the indicator is positioned at a geometric center of the predetermined operation area of the display is 50%.

8. The remote control apparatus according to claim 7, wherein:

the operation input section has a two-dimensional freedom of movement; and the control section controls the duty ratio of the drive signal provided to the at least one light based on an X-Y position of the indicator in the predetermined operation area of the display.

9. The remote control apparatus according to claim 8, wherein the control section controls the duty ratio of the drive signal provided to the at least one light using pulse width modulation of the drive signal provided to the at least one light.

10. The remote control apparatus according to claim 7, wherein the control section controls the duty ratio of the drive signal provided to the at least one light using pulse width modulation of the drive signal provided to the at least one light.

* * * * *